United States Patent
Eilts et al.

(10) Patent No.: US 10,126,424 B1
(45) Date of Patent: Nov. 13, 2018

(54) DUAL-POLARIZATION WEATHER RADAR DATA SYSTEM AND METHOD

(71) Applicant: Weather Decision Technologies, Inc., Norman, OK (US)

(72) Inventors: Michael Eilts, Norman, OK (US); James T. Johnson, Jr., Norman, OK (US); Christopher Porter, Norman, OK (US); Matthew Gaffner, Norman, OK (US); John William Conway, Norman, OK (US); Noah A. Lock, Norman, OK (US); Andrew MacKenzie, Norman, OK (US)

(73) Assignee: Weather Decision Technologies Inc., Norman, OK (US)

( * ) Notice: Subject to any disclaimer, the term of this patent is extended or adjusted under 35 U.S.C. 154(b) by 0 days.

(21) Appl. No.: 15/341,444

(22) Filed: Nov. 2, 2016

Related U.S. Application Data

(63) Continuation-in-part of application No. 14/615,920, filed on Feb. 6, 2015, now Pat. No. 9,519,057, which is a continuation-in-part of application No. 14/070,937, filed on Nov. 4, 2013, now Pat. No. 8,984,939, which is a continuation-in-part of application No. 13/374,447, filed on Dec. 29, 2011, now Pat. No. 8,601,864.

(60) Provisional application No. 61/460,786, filed on Jan. 7, 2011.

(51) Int. Cl.
*G01W 1/00* (2006.01)
*G01S 13/95* (2006.01)
*G01S 7/02* (2006.01)

(52) U.S. Cl.
CPC ............ *G01S 13/951* (2013.01); *G01S 7/024* (2013.01); *G01W 1/00* (2013.01)

(58) Field of Classification Search
None
See application file for complete search history.

(56) References Cited

U.S. PATENT DOCUMENTS

| | | | | |
|---|---|---|---|---|
| 3,268,891 A * | 8/1966 | Atlas | .......................... | G01S 1/02 342/181 |
| 4,106,015 A * | 8/1978 | Beguin | .................... | G01S 7/026 342/365 |
| 4,801,942 A * | 1/1989 | Markson | ................. | G01S 11/02 342/387 |
| 4,972,195 A * | 11/1990 | Markson | ................. | G01S 11/02 342/453 |

(Continued)

*Primary Examiner* — Andre Allen
(74) *Attorney, Agent, or Firm* — Phillips Murrah PC; Martin G. Ozinga

(57) ABSTRACT

The present invention essentially comprises a system, method, computer program and combinations thereof to utilize dual-polarization generated data generally associated with weather and non-weather events for mapping data, producing geo-referenced data, producing mosaics, generation of precipitation masks, non-precipitation mask, and classification masks in general, production of vertical cross sections and predetermined fly throughs, producing short term forecasting, prediction of specific weather phenomenon, correcting or adjusting rain gauge data as well as quantitative precipitation estimation, and combining other meteorological data to correct or adjust estimated rainfall accumulation gathered by dual-polarization radar.

4 Claims, 2 Drawing Sheets

(56) References Cited

U.S. PATENT DOCUMENTS

| | | | | |
|---|---|---|---|---|
| 5,557,040 | A | * | 9/1996 | Inenaga .................. G01W 1/14 250/559.09 |
| 8,601,864 | B1 | * | 12/2013 | Eilts ....................... G01S 7/025 342/26 D |
| 8,984,939 | B1 | * | 3/2015 | Eilts ....................... G01S 7/025 73/170.17 |
| 2007/0222660 | A1 | * | 9/2007 | Stagliano, Jr. .......... G01S 7/025 342/26 R |
| 2007/0222661 | A1 | * | 9/2007 | Stagliano, Jr. .......... G01S 7/025 342/26 R |
| 2009/0063074 | A1 | * | 3/2009 | Wang ....................... G03F 1/84 702/81 |
| 2009/0276940 | A1 | * | 11/2009 | Sallee ...................... A42B 3/24 2/435 |
| 2009/0295627 | A1 | * | 12/2009 | Venkatachalam ....... G01S 7/025 342/26 R |
| 2011/0063161 | A1 | * | 3/2011 | Ishizawa ................. G01S 7/023 342/159 |

\* cited by examiner

DUAL-POLARIZATION WEATHER RADAR DATA SYSTEM AND METHOD

CROSS-REFERENCE TO RELATED APPLICATIONS

The present application is a continuation-in-part of U.S. patent application Ser. No. 14/615,920 filed Feb. 6, 2015, currently pending, which is a continuation-in-part of U.S. patent application Ser. No. 14/070,937 filed Nov. 4, 2013, now U.S. Pat. No. 8,984,939, issued Mar. 24, 2015, which is a continuation-in-part of U.S. patent application Ser. No. 13/374,447, filed Dec. 29, 2011, now U.S. Pat. No. 8,601,864, issued Dec. 10, 2013, which claims priority from provisional patent application U.S. Ser. No. 61/460,786, filed Jan. 7, 2011. The entire content of each of the above-referenced applications is hereby expressly incorporated herein by reference.

BACKGROUND OF THE INVENTION

1. Field of the Invention

In general, the present invention relates to weather related dual-polarization radar data and uses of same. More specifically, but not to be considered limiting, the present invention provides a system and method for utilizing dual-polarization generated data generally associated with weather and nature events for mapping data; producing geo-referenced data; producing mosaics; generation of conditional precipitation masks; detecting various weather phenomenon such as hail, winter precipitation, and so forth; production of vertical cross sections and predetermined fly throughs; producing short term forecasting; prediction of specific weather phenomenon; correcting and or adjusting rain gauge data as well as quantitative precipitation estimation; combining other meteorological data to correct or adjust estimated rainfall accumulation gathered by dual-polarization radar; and or mapping airborne birds, insects, dirt, sand, debris from tornados and wind and or other non-precipitation events.

2. Description of the Prior Art

The word "radar" is an acronym for radio detection and ranging. During World War II, military radar operators noticed noise in returned echoes due to weather elements like rain, snow, and sleet. Just after the war, military scientists returned to civilian life or continued in the Armed Forces and pursued their work in developing a use for those echoes. In 1953, Donald Staggs, an electrical engineer working for the Illinois State Water Survey, made the first recorded radar observation of a "hook echo" associated with a tornadic thunderstorm. Between 1950 and 1980, reflectivity radars, which measure position and intensity of precipitation, were built by weather services around the world. During the 1970s, radars began to be standardized and organized into networks. The first devices to capture radar images were developed. The number of scanned angles was increased to get a three-dimensional view of the precipitation, so that horizontal cross-sections (CAPPI) and vertical ones could be performed. Studies of the organization of thunderstorms were then possible.

In 1964, The National Severe Storms Laboratory (NSSL) was formed and began experimentation on dual-polarization signals and on the uses for the Doppler effect. In May 1973, a tornado devastated Union City, Okla., just west of Oklahoma City. For the first time, a Dopplerized 10-cm wavelength radar from NSSL documented the entire life cycle of the tornado.

Between 1980 and 2000, weather radar networks became the norm and conventional radars were replaced by Doppler radars, which in addition to position and intensity it could track the relative velocity of the particles in the air. After 2000, research on dual-polarization technology has moved into operational use, increasing the amount of information available on precipitation type (e.g. rain vs. snow).

"Dual-polarization" generally means that microwave radiation, which is polarized both horizontally and vertically (with respect to the ground) is emitted. Most current weather radars, such as the National Weather Service NEXRAD radar, transmit radio wave pulses that have a horizontal orientation. Polarimetric radars (also referred to as dual-polarization radars), transmit radio wave pulses that have both horizontal and vertical orientations. The horizontal pulses essentially give a measure of the horizontal dimension of cloud (cloud water and cloud ice) and precipitation (snow, ice pellets, hail, and rain) particles while the vertical pulses essentially give a measure of the vertical dimension. Since the power returned to the radar is a complicated function of each particle's size, shape, and ice density, this additional information results in improved estimates of rain and snow rates, better detection of large hail location in summer storms, and improved identification of rain/snow transition regions in winter storms.

What is needed is to provide a system and or method that will fully utilize dual-polarization for weather information collection and interpretation where the prior art is deficient. Therefore, a need and a desire exist to provide a system and method that allows a more full utilization of the current technology to reap the beneficial results therein.

SUMMARY OF THE INVENTION

In view of the foregoing disadvantages and limitations inherent in the known uses of dual-polarization techniques now present in the prior art, the present invention provides a new and improved method and system wherein the same can be utilized where speed, ease of use, clarity and accuracy are desired. As such, the general purpose of the present invention, which will be described subsequently in greater detail, is to provide a new and improved weather related utilization of dual-polarization radar, which has all the advantages of the prior art and none of the disadvantages.

To attain this, the present invention essentially comprises a system, method, computer program and combinations thereof that utilizes dual-polarization radar data generally associated with weather and non-weather events for mapping data, producing geo-referenced data, producing mosaics, generation of precipitation and non-precipitation type classification of radar echoes, production of vertical cross sections and predetermined fly throughs, producing short term forecasting, prediction of specific weather phenomenon, correcting or adjusting rain gauge data as well as quantitative precipitation estimation, and combining other meteorological data to correct or adjust estimated rainfall accumulation gathered by dual-polarization radar.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved utilization of a dual-polarization weather radar system and method that improves the efficiency, accuracy, and detail of information gathering and analysis.

It is a further object of the present invention to provide a new and improved utilization of a dual-polarization weather radar system and method for predicting as well as analysis of weather events such as but not limited to wind, hail, snow, rain super-cooled liquid in clouds and so forth.

An even further object of the present invention is to provide a new and improved utilization of a dual-polarization weather radar system and method, which is susceptible to a relatively low cost of implementation, and which accordingly is then susceptible to low costs in general, thereby making such economically available to the consuming industry and public.

Still another object of the present invention is to provide a new and improved utilization of a dual-polarization weather radar system and method, which provides all of the advantages of the prior art, while simultaneously overcoming some of the disadvantages normally associated therewith.

Another object of the present invention is to provide a new and improved utilization of a dual-polarization weather radar system and method, which is of a reliable implementation for all types of weather events and data therefrom.

Yet another object of the present invention is to provide a new and improved utilization of a dual-polarization weather radar system and method, which may be easily and efficiently accessed, implemented, and utilized for utilization in multiple platforms such as but not limited to computers, PDA, phones and so forth.

Still another object of the present invention is to provide a new and improved utilization of a dual-polarization weather radar system and method that provides for mapping other non-precipitation events such as but not limited to airborne birds, insects, dirt, sand, debris from tornados, debris from winds and so forth.

Another object of the present invention is to provide a new and improved utilization of a dual-polarization weather radar system and method, which provides accumulation and or aggregate data of rain, snow, ice, hail and so forth over a time period.

These, together with other objects of the invention, along with the various features of novelty, which characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there are illustrated preferred embodiments of the invention.

BRIEF DESCRIPTION OF THE PICTORIAL ILLUSTRATIONS, GRAPHS, DRAWINGS, AND APPENDICES

The invention will be better understood and objects other than those set forth above will become apparent when consideration is given to the following detailed description thereof. Such description makes reference to the annexed pictorial illustrations, graphs, drawings, exhibits, screen captures and appendices.

FIG. 1 is an example of the structure of a horizontally polarized radio wave. The electric field wave crest is oriented in the horizontal direction (shading in this figure). The magnetic field wave crest is oriented in the vertical direction (white in this figure).

FIG. 2 is an example of the structure of a vertically polarized radio wave. The electric field wave crest is oriented in the vertical direction (shading in this figure). The magnetic field wave crest is oriented in the horizontal direction (white in this figure).

DETAILED DESCRIPTION OF THE PREFERRED EMBODIMENTS

In a preferred embodiment, the invention may be a system, method, process, method of doing business, and or a computer program with the understanding it may also be combinations of the same. It is understood that the following is for purposes of illustration and should not be considered to limit the scope of the invention. It is also understood that the current invention may be utilized for numerous applications. Furthermore, the terms "dual", "polarization", and dual-polarization" collectively and individually should not be considered limiting the scope of the invention as such.

A radio wave is a series of oscillating electric and magnetic fields. One cannot actually see the oscillating electric and magnetic fields, but the radar can detect and interpret them just as a car radio can detect and interpret those transmitted at the slightly lower frequencies. If, however, they would be visible, they would look something like the waves depicted below in FIG. 1 wherein an example of the structure of a horizontally polarized radio wave is depicted. The electric field wave crest is oriented in the horizontal direction (shading in this figure). The magnetic field wave crest is oriented in the vertical direction (white in this figure).

Figure 2:
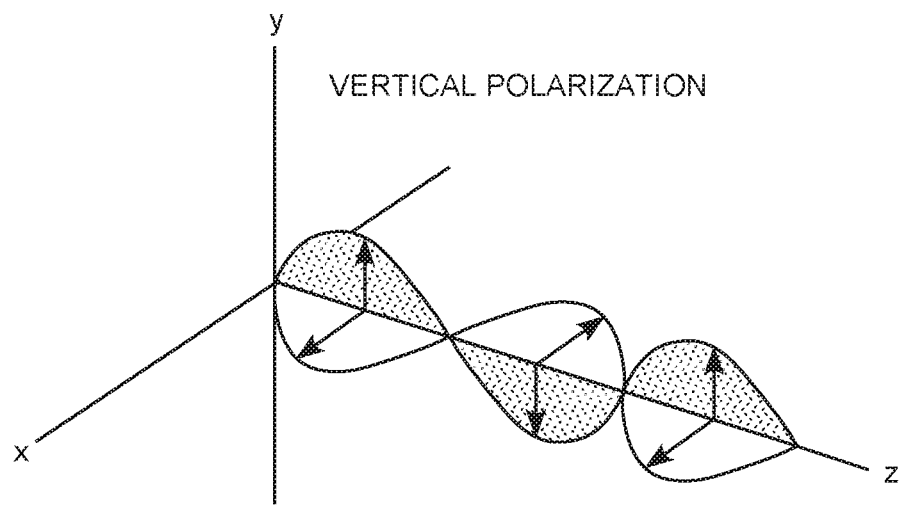

FIG. 2 is an example of the structure of a vertically polarized radio wave. The electric field wave crest is oriented in the vertical direction (shading in this figure). The magnetic field wave crest is oriented in the horizontal direction (white in this figure).

Figure 1:
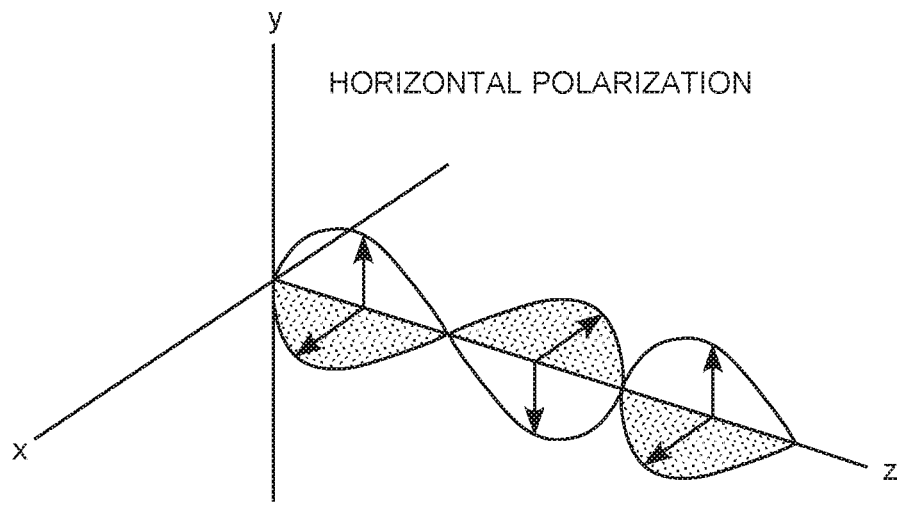

As can be seen in FIG. 1 and FIG. 2, the electric and magnetic fields are oriented at 90-degree angles to each other. This concept is important for understanding what is meant by polarization. That is, the polarization of the radio wave is defined as the direction of orientation of the electric field wave crest. Thus, in FIG. 1, the polarization is horizontal since the electric field wave crest (shown in shading) is aligned along the horizontal axis.

In FIG. 2, the polarization is vertical since the electric field wave crest (shown in shading) is aligned along the vertical axis. Polarimetric radars gain additional information about the precipitation characteristics of clouds by essentially controlling the polarization of the energy that is transmitted and received.

Most weather radars, including NEXRAD, transmit and receive radio waves with a single, horizontal polarization. That is, the direction of the electric field wave crest is aligned along the horizontal axis. Polarimetric radars, on the other hand, transmit and receive both horizontal and vertical polarizations. Although, there are many different ways to mix the horizontal and vertical pulses together into a transmission scheme, the most common method is to alternate between horizontal and vertical polarizations with each successive pulse. That is, first horizontal, then vertical, then horizontal, then vertical, etc. And, of course, after each transmitted pulse there is a short listening period during which the radar receives and interprets reflected signals from the cloud.

Figure 3:
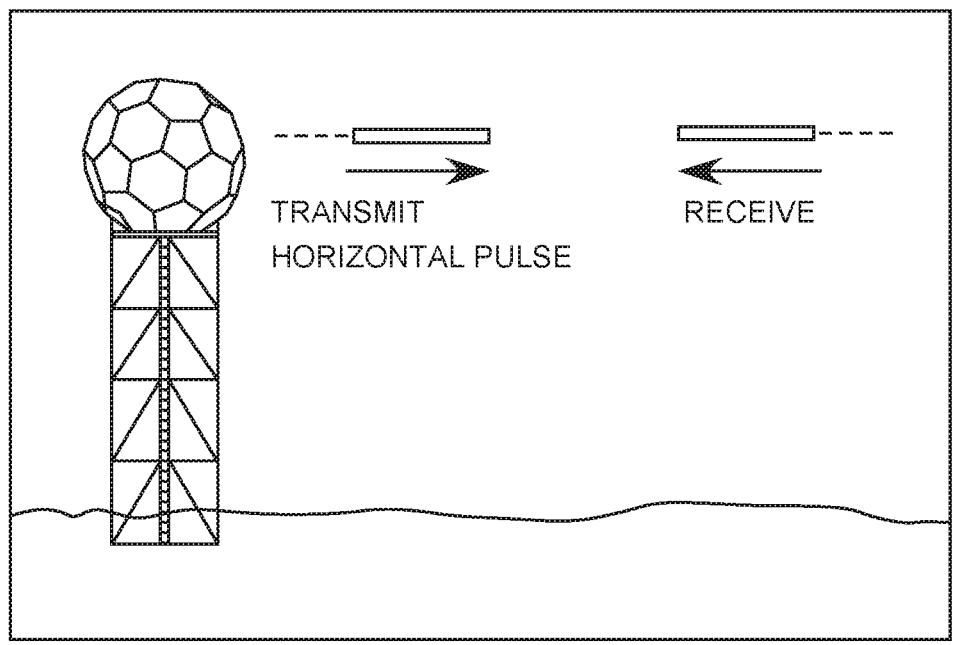
FIG. 3 is an example of a non-polarimetric radar's, such as NEXRAD (WSR-88D), transmit and receive only horizontal polarization radio wave pulses.
Figure 4:
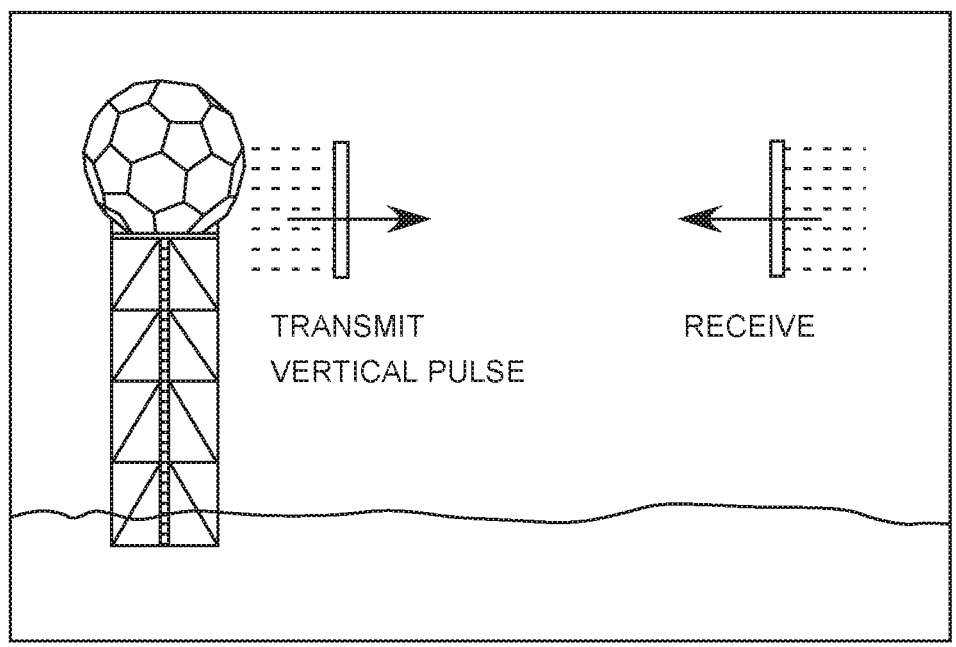
FIG. 4 is an example of a polarimetric radar's transmit and receive both horizontal and vertical polarization radio wave pulses.

Since polarimetric radars transmit and receive two polarizations of radio waves, they are sometimes referred to as dual-polarization radars. The difference between non-polarimetric and polarimetric radars is illustrated in FIGS. 3 and 4 wherein FIG. 3 generally depicts non-polarimetric radars, such as NEXRAD, that transmit and receive only horizontal polarization radio wave pulses. Therefore, they measure only the horizontal dimension of cloud and precipitation particles.

FIG. 4 generally depicts polarimetric radars that transmit and receive both horizontal and vertical polarization radio wave pulses. Therefore, they measure both the horizontal and vertical dimensions of cloud and precipitation particles. This additional information leads to improved radar estimation of precipitation type and rate.

All weather radars, including NEXRAD (WSR-88D), measure horizontal reflectivity. That is, they measure the reflected power returned from the radar's horizontal pulses. Polarimetric radars, on the other hand, measure the reflected power returned from both horizontal and vertical pulses. By comparing these reflected power returns in different ways (ratios, correlations, etc.), users are able to obtain information on the size, shape, and ice density of cloud and precipitation particles.

Some of the fundamental variables measured by polarimetric radars, and a short description of each, are as follows:

Differential Reflectivity—The differential reflectivity is a ratio of the reflected horizontal and vertical power returns. Amongst other things, it is a good indicator of drop shape. In turn, the shape is a good estimate of average drop size.

Correlation Coefficient—The correlation coefficient is a correlation between the reflected horizontal and vertical power returns. It is a good indicator of regions where there is a mixture of precipitation types, such as rain and snow.

Linear Depolarization Ratio—The linear depolarization ratio is a ratio of a vertical power return from a horizontal pulse or a horizontal power return from a vertical pulse. It too is a good indicator of regions where a mixture of precipitation types occur.

Specific Differential Phase—The specific differential phase is a comparison of the returned phase difference between the horizontal and vertical pulses. This phase difference is caused by the difference in the number of wave cycles (or wavelengths) along the propagation path for horizontal and vertically polarized waves. It should not to be confused with the Doppler frequency shift, which is caused by the motion of the cloud and precipitation particles. Unlike the differential reflectivity, correlation coefficient, and linear depolarization ratio, which are all dependent on reflected power, the specific differential phase is a "propagation effect". It is a very good estimator of rain rate.

Since the power returned to the radar is such a complicated function of the size, shape, and ice density of each cloud and precipitation particle, any information that we can gain about the average characteristics of the precipitation help us to better determine rain rates, snow rates, or even possibly the size of hail.

It is understood that polarimetric radar can give additional information on precipitation type and rate from a rain event by example. When compared to snow, rain is a very simple precipitation type. By means of example, if it were raining and theoretically had the ability to suddenly stop the rain from falling and grab a cubic meter of air that included the suspended raindrops and started removing the individual raindrops, you could examine the drops. Examining each of their sizes and adding up the total water content to get an estimate of the rain rate would then be possible. It is possible to find a few very big drops, no small ones, and get a rain rate of 0.5 inch per hour. If, however, the experiment was repeated after 15 minutes, a large number of very small drops and no big ones may be found, but still have a total rain rate of 0.5 inch per hour.

This is possible because the number and average size of the raindrops has changed dramatically but the rain rate has not. It is because, in the first sample, the rainwater was concentrated in a very small number of large drops and, in the second sample, the rainwater was concentrated in a very large number of small drops. Yet, since the reflected power returned to the radar is heavily weighted towards the largest drops, the power returned to the radar from the first sample might be as much as 10 times greater than the power returned to the radar from the second sample. By just using the returned power to estimate rain rate, it is possible to end up with either a significant overestimation or a significant underestimation of the rain rate. It would all depend on the dominant drop size. This can be a severe limitation of non-polarimetric radars.

Polarimetric radar provides a more accurate rate because the shape of the drop is more accurately determined. As a general rule, raindrops are not necessarily spherical in shape; very few drops are and typically only for the very smallest drops. For bigger drops, drag forces as they fall through the atmosphere causes a flattening effect that results in an almost "hamburger bun" type appearance for the very big drops. With polarimetric radar, it is possible to measure differential reflectivity. By first transmitting and receiving a horizontal pulse of energy, an indication of the horizontal dimension of the drop may be learned. When transmitting and receiving a vertical pulse of energy, another indication of the vertical dimension of the drop is learned. Combined, this information may get a measure of the average drop shape and, in turn, dominant drop size. This could be used to refine the radar rain rate estimate. It is further contemplated to use polarimetric radar power returned from oddly shaped snow, ice crystals, hail, and regions that contain mixtures of precipitation types.

Radars are not able to generally predict if it is going to rain tomorrow. However, once a cloud does develop and precipitation starts falling, it can be used to examine storm structure and estimate rain and snow rates. The improvements associated with polarimetric radars come from their ability to provide previously unavailable information on cloud and precipitation particle size, shape, and ice density. The current invention may allow use of dual-polarized radar data to have improved estimation of rain and snow rates, discrimination of hail from rain and estimating hail size, identification of precipitation type in winter storms, identification of severe storm morphology such as rear-flank downdrafts and tornado genesis, identification of electrically active storms, and identification of aircraft icing conditions.

It is also contemplated the current invention may provide techniques to use mathematical functions to weight the relative importance of the polarimetric variables as they relate to identifying each cloud, such as but not limited to cloud water and cloud ice, and precipitation such as but not limited to snow, ice pellets, hail, super-cooled liquid, and rain. For example, differential reflectivity may do a better job identifying one particle type, whereas specific differential phase may do a better job identifying another. By combining the weights for each variable, a "classification" of the dominant particle type can be determined for each portion of the cloud. This information can be used to improve predictions from short-term computer forecast models.

In addition to providing information on cloud and precipitation particle size, shape, and ice density, polarimetric radar variables also exhibit unique signatures for many non-meteorological scatterers. Examples would be birds and insects. Though radar measurements of birds and insects may not at first appear to be of interest to meteorologists, there are indeed applications. For example, the motion of the birds and insects may affect the measured Doppler winds, occasionally making interpretation of wind fields difficult. Radar measurements of birds and insects may also be of interest to other commercial and scientific disciplines. For example, birds are hazardous to aircraft. Therefore, radar measurements of birds might interest the aviation industry. Radar measurements of bugs might interest entomologists who study, for example, crop damage resulting from bug migrations. For weather radars, of course, birds and bugs are generally thought of as a data contamination. Fortunately, their unique polarimetric signatures generally make them easily identifiable in the data. This is not always the case for non-polarimetric radars.

Another problem that frequently plagues radar measurements is the presence of anomalous propagation, commonly referred to as AP. AP refers to a "ground return contamination" that sometimes occurs in the radar data when a warm layer of air forms above a cold layer of air. This phenomena, which is called an inversion layer, essentially bends the radar beam back towards the ground resulting in a ground return contamination that makes it very difficult, at times, to distinguish the location and intensity of clouds and precipitation. Polarimetric radar signatures also aid in the elimination of AP.

Dual-Polarization on a Map

In a preferred embodiment, dual-polarization (dual-pol) radar data may be utilized by displaying raw single site dual-polarization radar data and derived products from the data on a map. Raw single site radar dual-polarization data and derived fields from the data may be mapped to a common coordinate system, such as but not limited to MERCATOR, so that these data can be properly placed on open, such as but not limited to OPEN STREET MAP, and proprietary mapping systems, such as but not limited to GOOGLE mapping systems. These data may be shown to indicate various types of weather phenomenon and their location relative to points of interest on the map. It is contemplated to provide such to those in desire for such information on a customer basis.

Mosaics

It is further contemplated to provide a mosaic of combining data from multiple radars that each cover a geographic area to get a more complete picture in two dimensions, three dimensions, and combinations thereof of dual-polarization derived or raw parameters. Conventional weather radar data has been "mosaicked" together for many years to produce a seamless view of radar data from a group of radars rather than data being shown from each individual radar. With the dual-raw polarization radar data and the derived fields, these fields may be mosaicked together to provide a seamless view of hydrometeor classification (rain, snow, ice, hail, super-cooled liquid, and so forth), precipitation rates, and quantitative precipitation estimation.

Generation of a Precipitation Mask

It is contemplated to generate a classification mask that may include a precipitation mask, such as but not limited to rain, snow, sleet, hail, fog and combinations thereof, from dual-polarization parameters. The Hydrometeor Classification Algorithm (HCA) utilizes NEXRAD dual-polarization parameters to classify hydrometeors or non-hydrometeor backscatterers. Backscatter classifications include, but are not limited to, biological scatterers such as insects and birds, anomalous propagation/ground clutter, ice crystals, dry snow, wet snow, light-moderate rain, heavy rain, large raindrops, graupel, and rain mixed with hail. Using this precipitation type and classification mask to determine various precipitation types, such as but not limited to rain, snow, sleet, freezing rain, and so forth, can be mapped rather than simply applying a conditional mask to conventional radar data wherein it may only indicate that precipitation is occurring.

Generation of a Classification Mask in General

It is still further contemplated to generally generate a classification mask that may include non-precipitation events and or targets like airborne items such as but not limited to birds and flocks thereof, insects and swarms thereof, dirt, smog, dust and or dust storms, sand and or sand storms, debris from winds or in wind in general, debris and debris from or in tornados, hurricanes, and combinations thereof, from dual-polarization parameters. It is understood that debris from high winds and or tornados may be man-made items associated with tornado and high wind destruction as well as naturally occurring items such as but not limited to trees, brush, grass, animals and so forth. This may include, as generally stated above dual-polarization parameters to classify hydrometeors or non-hydrometeor backscatterers. It is also understood that both a precipitation mask and a general classification mask may both be utilized, generated, compared, and so forth.

Geo-Referenced Data

It is further contemplated to provide geo-referenced data, such as but not limited to polygons and or grids, of the size of hail, of precipitation accumulation, of icing conditions, and of various non-meteorological targets such as but not limited to insects, birds, dust, aerosol, wind-driven debris and so forth from dual-polarization parameters. It is also generally contemplated to provide geo-referenced data, such as but not limited to polygons of hail fall from past, current, and or future event.

The current invention contemplates geo-referenced data, such as but not limited to polygons, of size of hail size as derived from dual-polarization parameters. The Hailswath algorithm is designed to determine hail size and produce geo-referenced output of areas of hail from a single radar or from multiple radars in a mosaic. Hail size determination and areal extent of hail fall is accomplished through integration of the following meteorological datasets: dual-polarized radar data, conventional radar reflectivity, numerical weather prediction model data, visible and infrared satellite data and human observations of hail. Appropriate thresholds for the HCA output (i.e. minimum criteria) are chosen and applied to the meteorological datasets to define the length and width of a Hailswath along the hailsize. The hailsize magnitude is represented in multiple ways including but not limited to ranges of values (e.g.: 0.75"≤hail<2.00" and hail≥2.00" diameter) within a discrete, contoured analysis represented by polygons, gridded values of hailsize. These polygon data are then properly placed on open (Open Street Map) and proprietary mapping (Google) systems. The mapped hail analysis polygons may be shown along with human observations at the reported location and represented by a marker or icon which is color coded and labeled according to the size of hail.

The current invention also contemplates geo-referenced data, such as but not limited to polygons, of icing conditions as derived from dual-polarization parameters. Using output from the algorithms utilizing the dual-polarized radar data and integrating, observation data (surface observations of temperature, humidity, and so forth), numerical weather prediction data, radiosonde data (weather balloon-borne instruments) liquid drops/droplets are categorized and located in sub-freezing conditions, which are favorable for icing on aircraft. The results of the icing conditions algorithm are then contoured and properly placed on open (i.e., OPEN STREET MAP) and proprietary mapping (i.e., GOOGLE) systems.

Furthermore, it is contemplated that geo-referenced data, such as but not limited to polygons, of various non-meteorological targets, such as but not limited to insects, birds, dust, wind driven debris and so forth as derived from dual-polarization parameters. The current invention may allow for accurate data reflection of what is in the sky from a weather event, to a biological event, and even man made events such as debris fields in the air caused by a man made action.

The current invention utilizes single site dual-polarized radar data from multiple radars to create 2D and 3D mosaics (on a 3D high resolution grid) covering large areas (such as the entire country of the United States), of geo-referenced data, such as but not limited polygons, showing hail fall past, current, and future are derived from dual-pol parameters. Contoured hail size data is determined by the Hailswath algorithm either from current or past dual-pol radar data. These hail size data are then stored on computer disk for immediate access by a display system to show where hail has fallen, where it is currently falling or where it is forecast to fall on a geo-referenced map.

3D Dual-Polarization Mosaics and Fly Throughs

In a preferred embodiment, it is contemplated to utilize 3D dual-polarization mosaics for the production of vertical cross sections and pre-determined and non-predetermined fly throughs. Dual-polarization radar data may be collected at individual radar locations. Each radar scans 360 degrees of aziumuthal coverage at a number of different elevation angles. The collection of data from each radar's elevation angles is known as a volume. This 3D data set is then "mosaicked" or combined with other radar's volumes to create a 3D representation of data collected for a larger area. The 3D dataset of raw dual-polarization data and derived fields is used as input to a computer display system for showing predetermined and user-determined vertical cross sections and simulated "fly throughs" of the data.

Dual-Polarization Data as in Input

In another preferred embodiment of the invention, it is contemplated to use dual-polarization data as an input to a numerical modeling system to produce a short-term forecast, such as but not limited to up to 12 hours, use dual-polarization data as a predictor of specific weather phenomenon such as downbursts, lightning, and combinations thereof, use dual-polarization data to correct or adjust rain gauge data and produce a quantitative precipitation estimation (QPE), as well as using other meteorological data to correct or adjust dual-polarization estimated rainfall accumulation. Numerical weather prediction models are computer forecast systems that model the atmosphere and predict the various parameters associated with weather, such as but not limited to temperature, wind, occurrence of precipitation, and so forth. Both raw dual-polarization data and derived fields from the HCA are ingested into our numerical weather prediction model as observations of the state of the atmosphere at the beginning of the prediction time. This improved set of data better defines the actual state of the atmosphere that improves the accuracy and or precision of the forecasts.

Predictor of Specific Weather Phenomenon

It is also contemplated to use dual-polarization data as a predictor of specific weather phenomenon such as but not limited to downbursts and lightning. Numerous research studies of radar data have speculated that the existence of various forms of frozen precipitation, such as but not limited to snow, hail, and graupel located within specific locations of cloud systems are precursors to specific phenomenon such as downbursts and lightning. Using both raw dual-polarization data and derived fields from the HCA as input into the downburst prediction and lightning prediction algorithms, more accurate determination of the state of precipitation through depth of cloud systems serves as indicators of precursor conditions for both downburst and lightning occurrences.

It is also contemplated to use dual-pol data as a predictor of tornadoes and tornado damage. Research of dual-polarization radar data speculates that the detection of a "debris ball" associated with pre-tornado and tornado circulations indicates the presence of a tornado or tornado-like circulation. Using both the raw dual-pol data and derived fields from the HCA as input into the tornado debris algorithm, more precise prediction/determination of the location and strength of tornado and tornado-like circulations can be determined.

Dual-Polarization Data for Adjustment of Other Data

The current invention may also utilize dual-polarization data for the correction or adjustment of rain gauge data to produce a Quantitative Precipitation Estimation (QPE). It is also contemplated to use other meteorological data to correct or adjust dual-polarization estimated rainfall as well as other precipitation.

Invention 10 contemplates modification, adjusting, and or comparing of precipitation accumulation estimate from the dual-pol radar with an actual physical precipitation gauge reading. It is contemplated to combine the precipitation accumulation with precipitation gauges to "gauge correct" the precipitation accumulation estimate from the radar data. The radar estimate may then be modified by the gauge measurements. Adjustments may be to increase and or decrease the estimated amount depending on the measured amount in the physical gauge.

Therefore, invention 10 contemplates generating an estimated precipitation accumulation from said difference between said first precipitation mask at said first time period and said second precipitation mask from said second time period; providing at least one physical gauge for measuring a physical precipitation accumulation from said precipitation event; generating a measured physical precipitation accumulation in said at least one physical gauge from said precipitation event; and comparing said measured physical precipitation accumulation with said estimated precipitation accumulation to determine said actual precipitation accumulation.

Still further, invention 10 may have the steps of determining a measured physical precipitation accumulation in said at least one physical gauge from said precipitation event; and adjusting said estimated precipitation accumulation with said measured physical precipitation accumulation for said generating of said actual precipitation accumulation.

Dual-Polarization for Accumulations and or Aggregation Data Over a Time Period

Still another object of the present invention is to provide a new and improved utilization of a dual-polarization weather radar system and method, which provides accumulation and or aggregate data of rain, snow, ice, hail and so forth over a time period. The invention may generate a precipitation accumulation and or aggregate by generating a horizontal polarized radio wave pulse and a vertical polarized radio wave pulse; transmitting said horizontal polarized radio wave pulse and said vertical polarized radio wave pulse toward a precipitation event; receiving returned said horizontal polarized radio wave pulse and returned said vertical polarized radio wave pulse from said precipitation event; measuring the power of said returned said horizontal polarized radio wave pulse and said returned said vertical polarized radio wave pulse from said precipitation event; comparing said power of said returned said horizontal polarized radio wave pulse and said power of said returned said vertical polarized radio wave pulse from said precipitation event; generating a first precipitation mask from said comparing of said power of said returned said horizontal polarized radio wave pulse and said power of said returned said vertical polarized radio wave pulse from said precipitation event at a first time period; generating a second precipitation mask from said comparing of said power of said returned said horizontal polarized radio wave pulse and said power of said returned said vertical polarized radio wave pulse from said precipitation event at a second time period; comparing the difference between said first precipitation mask at said first time period and said second precipitation mask from said second time period; and generating said precipitation accumulation from said difference between said first precipitation mask at said first time period and said second precipitation mask from said second time period.

It is understood that the first time period may be any time interval such as second, minute, hour and so forth. The time interval may also be less than a second. It is also understood that the invention may make several comparisons and that more than just two time intervals may be utilized. The comparison may be over a continuous time period, increments, combinations thereof and so forth.

Operation Systems

It is understood that in a preferred embodiment, the invention may generally utilize a computer system. The system may include various input/output (I/O) devices (e.g., mouse, keyboard, display, Internet-enabled mobile phone, servers, and Internet-enabled PDA) and one or more general purpose computers having a central processor unit (CPU), an I/O unit and a memory that stores data and various programs such as an operating system, and one or more authoring applications (e.g., programs for word processing, creating spread sheets, and producing graphics), one or more client applications (e.g., programs for accessing online services), and one or more browser applications (e.g., programs for retrieving and viewing electronic documents from the Internet and/or Web). The computer system may also include a communications device (e.g., a satellite receiver, a modem, or network adapter) for exchanging data with a host through a communications link (e.g., a telephone line and/or a wireless link) and/or a network.

It is contemplated that the invention may be activated, accessed, utilized and so forth by the use of a computer screen related desktop icon for instantaneous retrieval. It is understood that in a preferred embodiment, the icon will be located in a lower location such as but not limited to a tool bar commonly associated at the bottom right of a computer screen. The invention may be accessed by other means and the icon use should not be considered limiting the scope of the invention. The invention may be utilized with any and all types of internet communication portals. Further, the invention should not be considered limited to existing systems and that the invention may be utilized with other types of internet communication portals.

Likewise, it is contemplated that the invention may be utilized in other means other than a personal computer screen application. It may be utilized with hand held devices, cellular phones, PDAs, and car computer systems or displays. It also includes devices that are mobile, devices that are stationary and or devices that are a combination of mobile and or stationary. It is further contemplated that the invention may be utilized with public phones that may include a visual screen or display. Likewise, free standing kiosks, booths or other locations may be specifically established to provide a display and access to the invention and said invention may include such established physical access ports, places, kiosks, and the like.

It is still contemplated that the invention may include, utilize, be selectively accessed by specified groups or sub groups, such as a designated entity like a business, center, city and so forth. It is contemplated that the invention may include specific promotional materials that companies have produced and would pay the manufacturer or business to appear on line with the business that is listed or has an ad or web site. This would include any and all types of information including local, regional, national, international and worldwide. It can be placed permanently or temporarily including web sites, ads, commercials and any and all type of promotions, advertising, informational and communication data and not excluding any other form or type of knowledge.

It is further contemplated the current invention may be utilized by existing technology such as but not limited to WEATHER DECISION TECHNOLOGIES Inc.'s interactive weather map known under the trademark IMAP that is a user-friendly way to get weather forecasts and current conditions, view radar and satellite images, see real-time lightning strikes, get nautical information and so forth via wireless and wired devices such as but not limited to internet services, cellular phone services, and media outlets such as news and weather station. It is also contemplated to utilize the current invention for digital geographic interactive maps and weather information, data, and streams for such applications as the IMAP, IMAP INTERACTIVE, IMAP LIVE and combinations thereof.

Changes may be made in the combinations, operations, and arrangements of the various parts and elements described herein without departing from the spirit and scope of the invention. Furthermore, names, titles, headings and general division of the aforementioned are provided for convenience and should, therefore, not be considered limiting.

We claim:

1. A method for generating a precipitation accumulation comprising the steps:
    generating a horizontal polarized radio wave pulse and a vertical polarized radio wave pulse;
    transmitting said horizontal polarized radio wave pulse and said vertical polarized radio wave pulse toward a precipitation event;
    receiving returned said horizontal polarized radio wave pulse and returned said vertical polarized radio wave pulse from said precipitation event;
    measuring the power of said returned said horizontal polarized radio wave pulse and said returned said vertical polarized radio wave pulse from said precipitation event;
    comparing said power of said returned said horizontal polarized radio wave pulse and said power of said returned said vertical polarized radio wave pulse from said precipitation event;
    generating a first precipitation mask from said comparing of said power of said returned said horizontal polarized radio wave pulse and said power of said returned said vertical polarized radio wave pulse from said precipitation event at a first time period;
    generating a second precipitation mask from said comparing of said power of said returned said horizontal polarized radio wave pulse and said power of said returned said vertical polarized radio wave pulse from said precipitation event at a second time period;
    comparing the difference between said first precipitation mask at said first time period and said second precipitation mask from said second time period;
    generating said precipitation accumulation from said difference between said first precipitation mask at said first time period and said second precipitation mask from said second time period;
    providing a precipitation gage for collecting physical precipitation; and
    comparing said precipitation accumulation generated from said difference between said first precipitation mask at said first time period and said second precipitation mask from said second time period data of said precipitation accumulation and said physical precipitation collected from said precipitation gage.

2. The method of claim 1 wherein said precipitation event is rain.

3. The method of claim 1 wherein said precipitation event is snow.

4. The method of claim 1 wherein said precipitation event is ice.

* * * * *